United States Patent [19]
Matsumoto

[11] Patent Number: 5,862,778
[45] Date of Patent: Jan. 26, 1999

[54] HOUSING FOR SMALL PET ANIMALS SUCH AS RODENTS OR THE LIKE

[75] Inventor: Yukihiko Matsumoto, Osaka, Japan

[73] Assignee: Kabushiki Kaisha Tominaga Jyushi Kogyosho, Osaka, Japan

[21] Appl. No.: 916,448

[22] Filed: Aug. 22, 1997

[30] Foreign Application Priority Data

Aug. 23, 1996 [JP] Japan .................................. 8-222025

[51] Int. Cl.⁶ .................................................. A01K 1/00
[52] U.S. Cl. .......................................... 119/472; 119/452
[58] Field of Search .................. 119/472, 473, 119/474, 452, 453, 421, 417

[56] References Cited

U.S. PATENT DOCUMENTS

| | | | |
|---|---|---|---|
| 3,815,549 | 6/1974 | Opmeer | 119/472 X |
| 4,314,410 | 2/1982 | Nichols | 119/452 X |
| 4,677,938 | 7/1987 | Tominaga | 119/421 |
| 4,953,502 | 9/1990 | Hoover | 119/452 |
| 5,054,427 | 10/1991 | Hoover | 119/452 |
| 5,134,969 | 8/1992 | Mason et al. | 119/472 |

*Primary Examiner*—Robert P. Swiatek
*Assistant Examiner*—James S. Bergin
*Attorney, Agent, or Firm*—Armstrong, Westerman Hattori, McLeland & Naughton

[57] ABSTRACT

A housing for small pet animals such as rodents or the like has a base box with an underground passage forming member disposed in a front portion of the base box. The underground passage forming member has a front-opened underground passage portion formed like a nest-hole. A transparent front panel is disposed in front of the underground passage forming member so as to close the front-opened underground passage portion. A top board is placed on the base box so as to close the opened upper portion thereof. A lower opened cage is placed on the top board. The underground passage portion and a space in the cage communicate with each other through an exit-and-entrance opening formed on the top board.

16 Claims, 5 Drawing Sheets

HOUSING FOR SMALL PET ANIMALS SUCH AS RODENTS OR THE LIKE

TECHNICAL FIELD OF THE INVENTION

This invention relates to housings for small pet animals such as rodents, e.g., hamsters, mice, gerbils, rabbits, or the like.

RELATED ART

Recently, hamsters, for example, have become increasingly popular small pet animals. As a breeding housing for a hamster, a cage or a molded plastic container has been commonly used. In the breeding housing, a small house, an exercise wheel, a feeding dish, a water bottle, an excretion tray, or the like, are typically provided.

A hamster, for example, inherently has a natural characteristic, or habit, of not only acting on the ground but also making a nest-hole under the ground and inhabiting therein, i.e., sleeping, eating, excreting, and the like. Conventional breeding housings, however, provide a hamster with acting space on the ground to some degree, but cannot provide a hamster with a nest-hole under the ground. A small house placed upon the ground surface in a breeding housing has been used as a limited substitute for a nest-hole. However, such a small house cannot necessarily satisfy the habit mentioned above. Thus, a hamster often tries to dig into the bottom of the breeding housing.

In addition, a hamster typically spends a longer time within the house than outside of the house. These habits prevent people from observing the hamster's actions—especially since a hamster spends most of the time in the house during the daytime. Thus, it is very difficult to observe their lovely behavior and/or sleeping style as long as they are in the house.

In the case of a cage-type breeding housing, though it is comfortable for a hamster in the summer, it is too cold in the winter—even if a small house is provided therein. On the other hand, in the case of a plastic container-type breeding housing, though it is comfortable for a hamster in the winter, it is too hot therein in the summer. Therefore, if hamsters are contained in either of the above breeding housings throughout the year, they can often die at the turn of a season.

OBJECTS OF THE INVENTION

An object of the present invention which was made—in part to resolve the aforementioned problems is therefore to provide a breeding housing which has a better habitat for small pet animals such as rodents, or the like, and which can decrease their stress by providing more natural living conditions and which can allow people to observe their lovely behavior at any time.

Another object of the present invention is to provide a breeding housing in which small pet animals such as rodents, or the like, can maintain good health even during changes in the seasonal environment.

Other objects and advantages of the present invention will become apparent from the description of the preferred embodiments, which may be modified in any manner without departing from the scope and spirit of the invention.

SUMMARY OF THE INVENTION

According to the present invention, a breeding housing for small pet animals such as rodents, or the like, includes a base box having an underground passage forming member disposed in a front portion of the base box. The underground passage forming member has a front-opened underground passage portion formed like a nest-hole. A transparent front panel is disposed in front of the underground passage forming member so as to close the front-opened underground passage portion. A lower opened cage is placed on a ceiling panel formed on the base box. The underground passage portion and a space in the cage communicate with each other through an opening formed in the ceiling panel.

Therefore, a hamster, for example, can move actively in a large space formed in the cage and can also enter into the underground passage portion through the opening at any time. In the underground passage portion, a hamster can enjoy a nest-hole life in a better habitat which is in conformity to its living habits, thus reducing the hamster's stress.

Because the underground passage portion formed like a nest-hole is formed to be front-opened and is covered by a transparent front panel, a hamster's lovely behavior and actions in the cage and even in the underground passage portion can be observed anytime through the transparent front panel.

In addition, because a well-ventilated exercise space in the cage and a closed underground passage portion formed like a nest-hole covered by a transparent front panel are provided, a hamster can spend time in the well-ventilated space in the cage when it is hot and also can spend time in the underground passage portion formed like nest-hole when it is cold. Thus, a hamster can move to more comfortable living conditions as needed. Therefore, a hamster can maintain good health during changes in the seasons and live a long time.

Preferably, in the above-mentioned breeding housing, a blind panel is detachably or openably provided adjacent to the transparent front panel. The blind panel can make the inside of the underground passage portion dark like a natural nest-hole when it is not being observed so that a hamster can be allowed to rest more freely.

The base box preferably has a small compartment that is equipped with a door to open and close the compartment. In this manner, a user can accommodate food or tools in the compartment and can maintain a cleaner area around the breeding housing.

The size of the base box is preferably smaller than that of the under-opened cage so that the base box can be accommodated in the cage placed upside down. As a result, when it is not being used, the apparatus can be maintained in a smaller space and can be carried more easily. In addition, the cage can serve to protect the base box.

The base box preferably has, at its upper end portion, an upstanding peripheral wall for holding a lower end portion of the cage. This structure also prevents a hamster from scattering food or excretion over outside of the breeding housing.

DETAILED DESCRIPTION OF THE PREFERRED EMBODIMENTS

Preferred embodiments of a breeding housing for small animals such as rodents, or the like, according to the present invention, will now be described in detail, with reference to the accompanying drawings.

Figure 1:
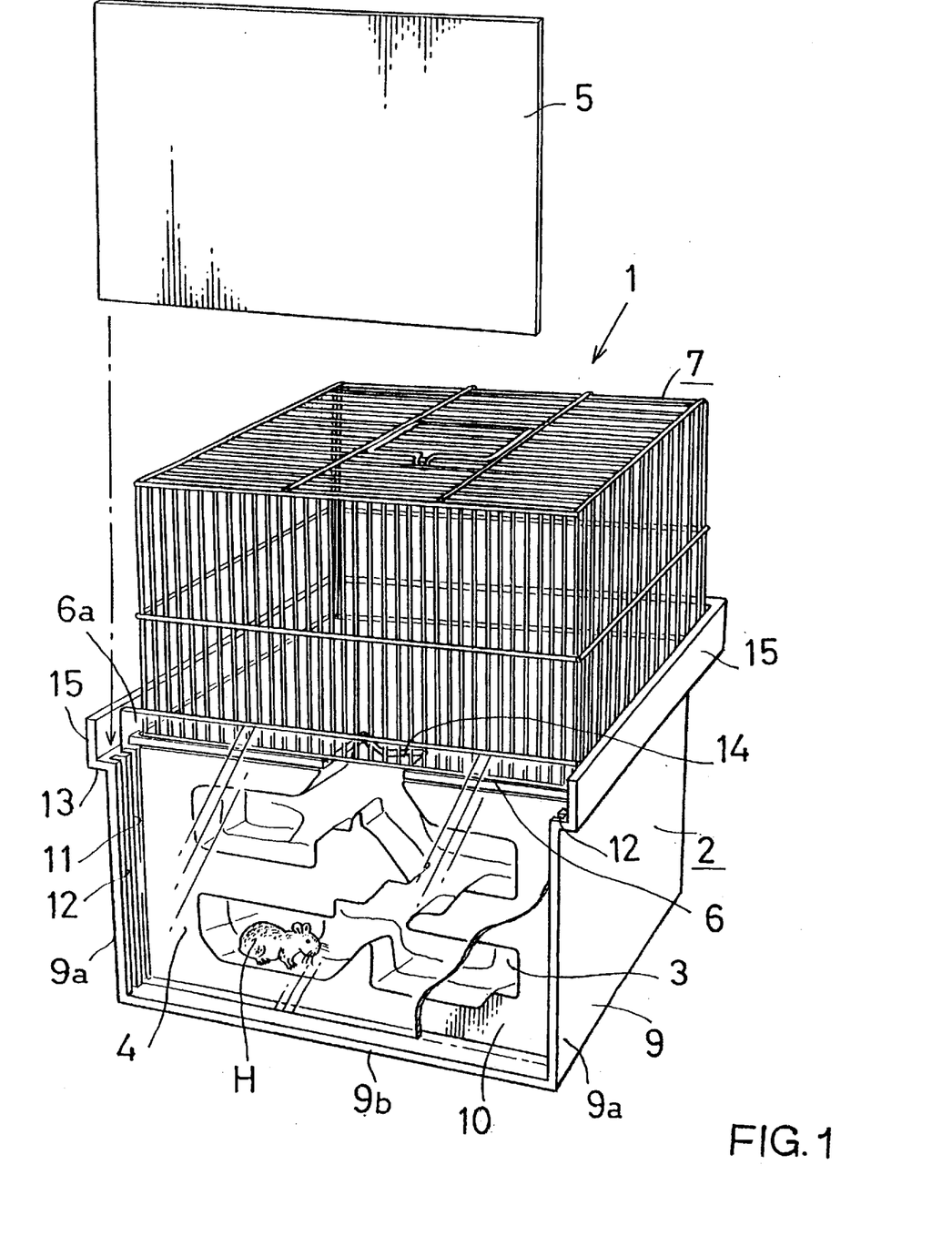
FIG. 1 shows a perspective view of a breeding housing of an embodiment according to the present invention, in which a blind panel is detached from a base box.
Figure 2:
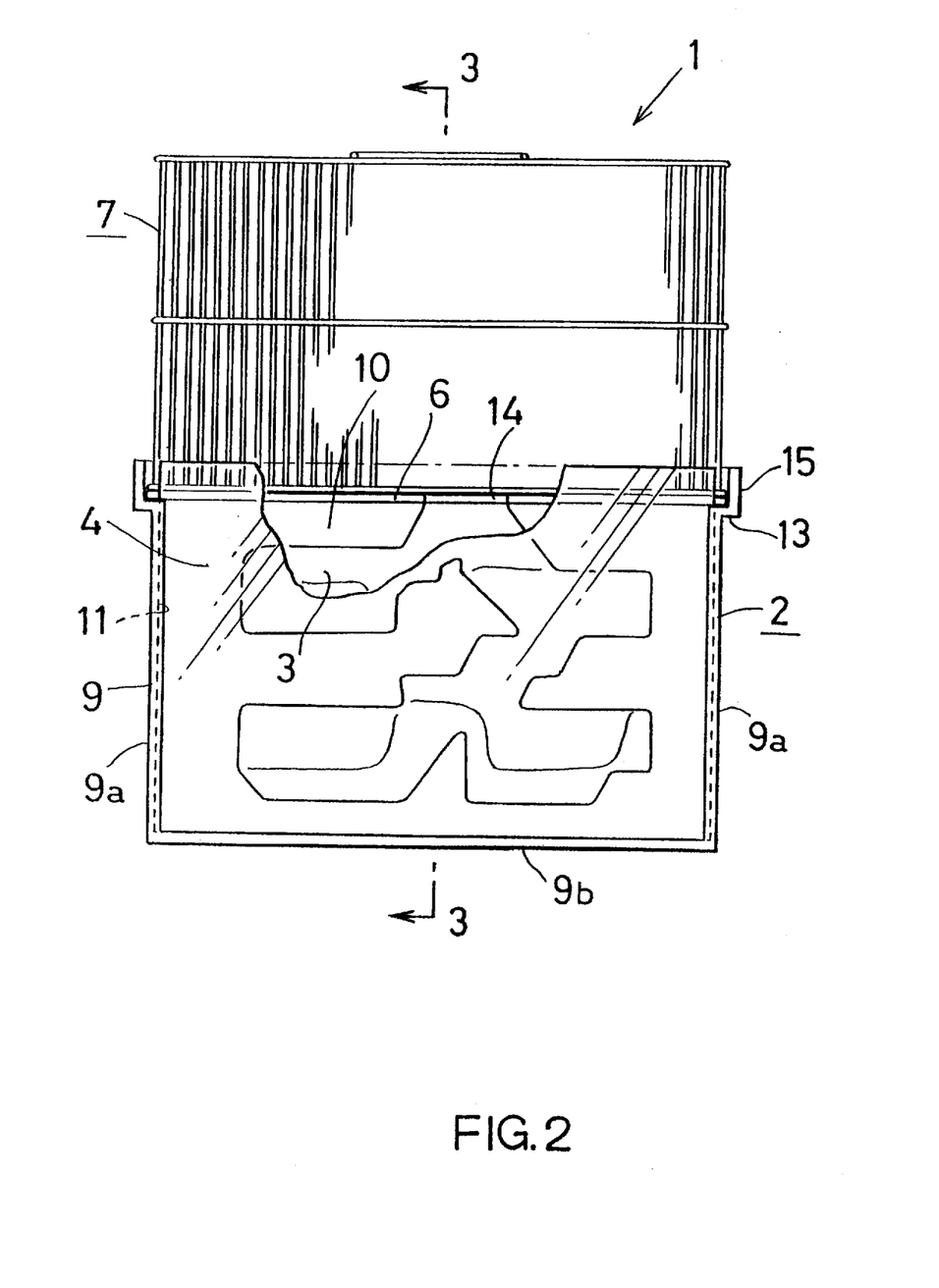
FIG. 2 shows a front view of the breeding housing, in which a transparent front panel is partially broken.
Figure 3:
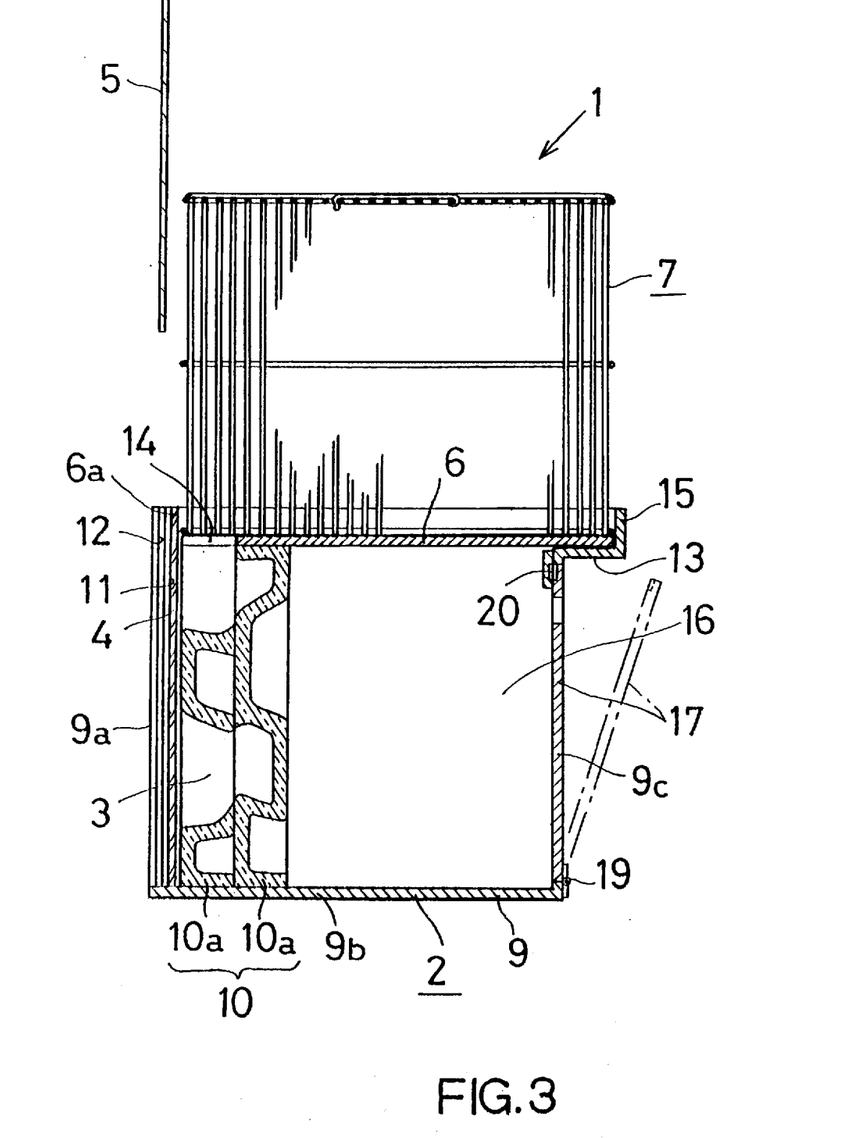
FIG. 3 shows a cross-sectional view taken along the line 3—3 in FIG. 2.

FIGS. 1–3 show a breeding housing 1 which is preferably used for a hamster. The housing 1 includes a base box 2, an underground passage portion 3 shaped like a nest-hole, a transparent front panel 4, a blind panel 5, a top board 6 as a ceiling and a floor, and a cage 7.

The base box 2 includes a front opened and upper opened square-shaped main box 9. The main box 9 has a bottom wall 9b, right and left walls 9a, 9a each extending upwardly from both side edges of the bottom wall 9b and back wall 9c extending upwardly from the rear edge of the bottom wall 9b. The base box 2 is a molded plastic article of a given shape. A square-shaped underground passage forming member 10 is fitted in the front-opened portion of the main box 9 and is integrally connected thereto so as to close the front opened portion thereof.

The underground passage forming member 10 has, on its front surface, a front-opened underground passage portion 3 shaped like a nest hole. The underground passage portion 3 extends in a number of directions—upward, downward, right and left—so as to provide a plurality of rooms such as a storage room, an excretion room or some other rooms, taking into account the hamsters natural habits in a nest-hole. The underground passage forming member 10 also has, on its top surface, an opening 14 so that a hamster H can go in and out the underground passage portion 3. As shown in FIG. 3, the underground passage forming member 10 comprises a plurality of molded plastic underground passage forming members 10a, 10a combined in the direction of fore and aft. Thus, the underground passage portion 3 is formed to be three dimensional so as to extend not only upward and downward but also forward and rearward.

A transparent front panel 4 is detachably attached to the front portion of the base box 2 so as to close the front-opened underground passage portion 3 of the most forward underground passage forming member 10a. The transparent front panel 4 prevents scattering of contents such as food, bedding, or the like, and allows users to observe a hamster's H behavior in the underground passage portion 3 therethrough. The transparent front panel 4 is preferably made of a square-shaped acrylic acid resin plate, or the like, having a higher transparency, However, the transparent front panel 4 is not necessarily transparent and colorless as long as the panel allows users to observe the inside of the underground passage portion 3. The panel 4 may be colored, transparent or semi-transparent. As for the materials, any resins other than the above or glass may be allowed. In this specification, the word "A transparent front panel 4" is used as a meaning including any plate-shaped material which enables a user to see the inside of the underground passage portion 3.

The transparent front panel 4 is attached to the main box 9 as follows. The underground passage forming member 10 is disposed slightly inside of the front opening of the main box 9 such that the side walls 9a, 9a and bottom wall 9b of the main box 9 protrude forward from the underground passage forming member 10.

On the corresponding inside surfaces of the projected portions of the side walls 9a, 9a, fitting grooves 11, 11 for slidably fitting the transparent front panel 4 are formed adjacent to the underground passage forming member 10 so as to extend in a vertical direction. The grooves 11, 11 have opened ends at the upper edges of the side wall 9a, 9a and extend to the surface level of the bottom wall 9b. Therefore, the transparent front panel 4 is slidably attached to the main box 9 from the upper side thereof with side edges of the front panel 4 being slid into the grooves 11, 11. The transparent front panel 4 is supported on the projected bottom wall 9b of the main box 9. Thus, the transparent front panel 4 is disposed so as to close the underground passage portion 3. The transparent front panel 4 can be detached from the main box 9 by sliding the panel 4 upwardly.

In the embodiment described above, the transparent front panel 4 is detachably attached to the main box 9. However, the front panel 4 may be hinged to the bottom wall 9b or to one side wall 9a so that the panel 4 can open and close the main box 9.

A blind panel 5 is disposed adjacent to the front side of the transparent front panel 4 so as to cover the front panel 4 and shield the underground passage portion 3. The blind panel 5 is preferably made of a square-shaped opaque resin plate or a cardboard, or the like, having a higher shading performance. The blind panel 5 is detachably attached adjacent to the front side of the transparent front panel 4 in the front portion of the main box 9.

The blind panel 5 is attached to the main box 9 as follows. On the corresponding inside surfaces of the projected portions of the side walls 9a, 9a of the main box 9, fitting grooves 12, 12 for slidably fitting the blind panel 5 are formed slightly in front of the fitting grooves 11, 11 for fitting the transparent front panel 4 so as to extend vertically. The grooves 12, 12 have also opened edges at the upper edges of the side wall 9a, 9a and extend to the surface level of the bottom wall 9b. Therefore, the blind panel 5 is slidably attached to the main box 9 from the upper side thereof with side edges of the blind panel 5 being slid into the grooves 12, 12. The blind panel S is supported on the projected bottom wall 9b of the main box 9. Thus, the blind panel 5 is disposed so as to shield the underground passage portion 3. The blind panel 5 can also be detached from the main box 9 by sliding upwardly.

In the embodiment described above, the blind panel 5 is detachably attached to the main box 9. However, the blind panel 5 may be hinged to the bottom wall 9b or to one side wall 9a so that the panel 5 can open and close the main box 9.

Figure 4:
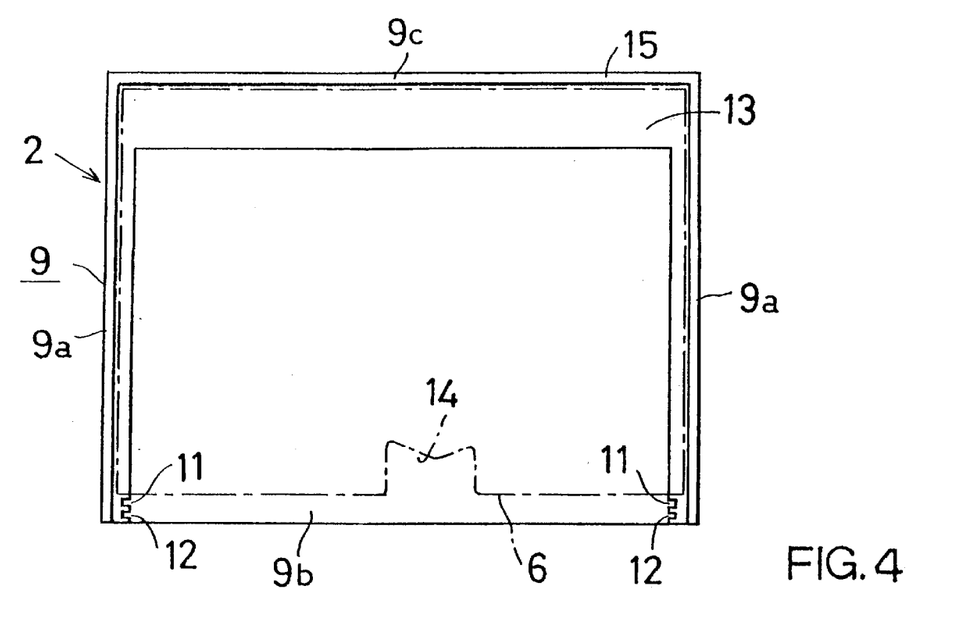
FIG. 4 shows a top view of the base box.

As shown in FIG. 4, on the upper edges of the side wall 9a, 9a and the back wall 9c, surrounding the upper opening of the main box 9, there is an outwardly protruded peripheral edge 13 having the same height as the upper edge of the underground passage forming member 10. A square-shaped top board 6 is, at its peripheral edge, supported on the upper surface of the outwardly protruded peripheral edge 13 and the upper end surface of the underground passage forming member 10 so as not to protrude forward from the underground passage forming member 10. The top board 6 closes the upper opening of the main box 9. A square-shaped metallic cage 7 is placed on the top board 6. Thus, the top board 6 also functions as a floor board.

An exit opening portion 14 is cut out of the front edge portion of the top board 6. As a result, the underground passage portion 3 and the inside of the cage 7 communicate so that a hamster H can go in between these areas.

At the outer most edge portion of the outwardly protruded peripheral edge 13, surrounding the upper opening of the main box 9, there is an upstanding peripheral wall 15 for fitting the cage 7 therein. The height of the peripheral wall 15 is preferably set in a range of from about 40 mm to about 60 mm so as to prevent a hamster H from scattering food or excreta.

For the same reason, said front panel 4 is also preferably protruded from the top board in a range of from about 40 mm to 60 mm.

Figure 5:
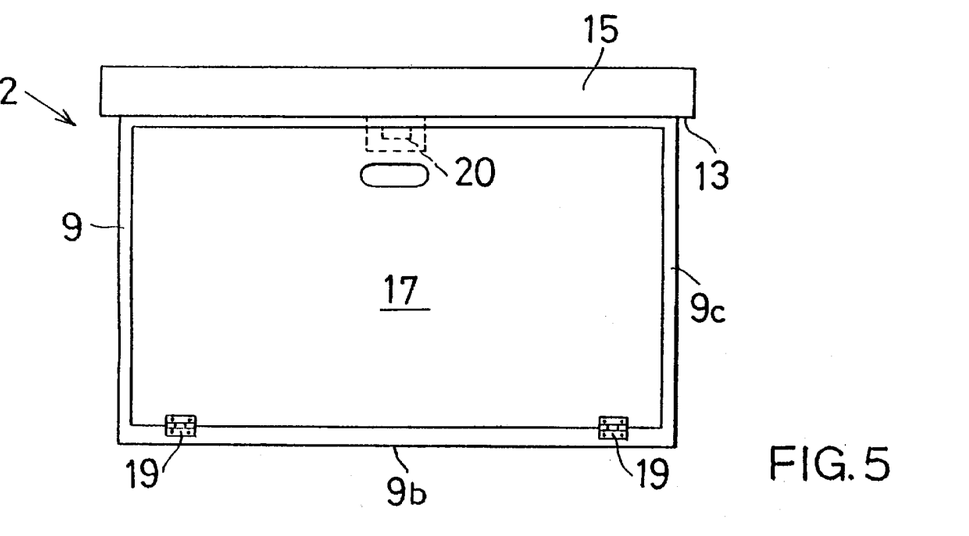
FIG. 5 shows a back view of the base box.

As shown in FIGS. 3 and 5, a space behind the underground passage forming member 10 in the main box 9 forms a compartment 16 for storing small articles. The compartment 16 is opened and closed by a door portion 17. The door portion 17 is hinged by a hinge 19 to a lower edge portion of the main box 9 at its lower edge portion. The door is maintained closed by the force of a magnet 20 equipped on an upper end portion of the main box 9.

Figure 6:
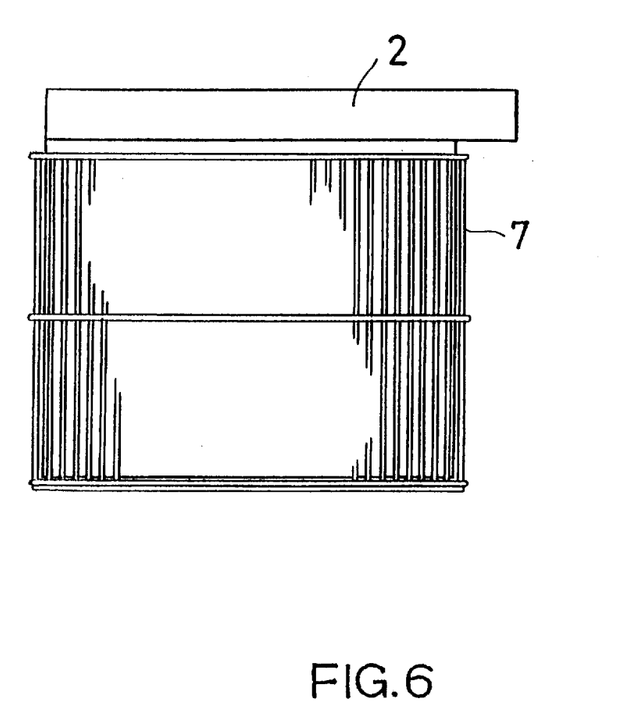
FIG. 6 shows a side view of the breeding housing in such a state that the base box is accommodated in the cage.

The size of above-mentioned base box 2 is smaller than that of the cage 7. Therefore, as shown in FIG. 6, the base box 2 can be accommodated inside of the cage 7 when placed therein upside down.

In the above-mentioned breeding housing 1, a hamster H can enjoy ground activities in the open wide space in the cage 7, while the hamster can get into the underground passage portion 3 formed like a nest-hole through the exit opening portion 14 so that the hamster can enjoy his inherent nest-hole life style at any time, Thus, a hamster H can enjoy a nest-hole life in a better habitat that is in conformity to its living habits with less stress.

When a hamster H is in the cage 7, a hamster H can be observed through the cage 7. Even if a hamster H moves in the underground passage portion 3 and enjoys a nest-hole life, a hamsters lovely behavior or sleeping pose, or the like, can be observed through the transparent front panel 4 at any time. Also a hamster's nest-hole living can be zoologically observed in detail.

Both the ventilated cage 7, having an activity space, and is the underground passage portion 3, having an closed space covered by the transparent front panel 4, are provided so that a hamster H can move in the cage 7 when it is hot and move into the underground passage portion 3 when it is cold. Thus, a hamster H can move into better habitats for itself and can live healthily for a long time during environmental changes such as changing the seasons.

In above-mentioned breeding housing 1, the underground passage portion 3 can be opened by removing the transparent front panel 4 from the main box 9 so that the inside of the underground passage portion 3 can be cleaned easily.

Furthermore, a hamster H can be kept in the underground passage portion 3 when the cage 7 is cleaned, or he can be kept in the cage 7 when the underground passage portion 3 is cleaned. Thus, a hamster H can be contained and cared for easily when the breeding housing 1 is cleaned.

Because the blind plate 5 is detachably equipped to the main box 9, the blind plate 5 can be removed or opened when a hamster H is observed or the blind plate 5 can keep the inside of the underground passage portion 3 dark like a nest-hole. Therefore, a hamster H can be secure mentally and physically.

Food, breeding tools, or the like, can be accommodated in the main box 9 through a door portion 17 formed at the back wall 9c or a side wall 9a of the base box 2. Thus, a user can maintain the area around the breeding housing 1 clean and neat.

As shown in FIG. 6, the whole breeding housing 1 can be kept and carried compactly with less space by accommodating the base box 2 inside of the cage 7 when not in use. And, the cage 7 can work as a protector of the base box 2, preventing the base box 2 from being damaged.

The upstanding peripheral wall 15 formed on the upper peripheral edge of the base box 2 prevents a hamster H from spreading food or excretion out of the casing, thereby keeping the area around the breeding housing 1 clean.

The preferred embodiments of the present invention are described above, however, the present invention is not limited to the above embodiments and can be variously changed. For example, the above mentioned embodiment is directed to a hamster's breeding housing, however, the present invention can also be applied to a breeding housing for a mouse, a gerbil, a squirrel, a rabbit, or the like.

In the above mentioned embodiments, the transparent front panel 4 and the blind panel 5 are detachably attached to the base box 2. However, they may be rotatably connected to the base box 2 by hinges, or the like. Further, in the above mentioned embodiments, the door portion 17 is formed on the back wall portion of the base box 2. However, the door portion may be formed on the side wall portion thereof.

As mentioned above, a housing for small pet animals such as rodents, or the like, according to the present invention, includes a base box having an underground passage portion formed like a nest-hole, and an under-opened cage placed on a top board which is formed on the base box and used both as a ceiling board of the base box and a floor board of the under-opened cage. An entrance and exit opening portion communicating the base box with the under-opened cage is formed in the top board. Therefore, if a hamster is to be contained therein, a hamster can move actively in an open space in the cage while he can get into the underground passage portion formed like a nest-hole through the exit opening and can enjoy an inherent nest-hole life. Thus, a hamster can live in a better habitat, that is in conformity to its living habits, with less stress.

Since the underground passage portion formed like nest-hole is formed so as to be front-opened and is covered by a transparent front panel attached at the front of the base box, a hamster's lovely behavior and actions even in the underground passage portion can be observed through the transparent front panel at any time.

Furthermore, the use of both the well-ventilated exercise space in the cage and the closed underground passage portion provides a more comfortable living habitat for a hamster. Thus, the hamster can live healthy for a long time even during changes in the season because a hamster can choose to move into the well-ventilated space in the cage when it is hot or to hide in the underground passage portion when it is cold.

In above mentioned housing, as the transparent front panel is detachably attached or is connected in an open-and-close manner to the front of the main casing, the underground passage portion can easily be cleaned by removing or opening the transparent front panel.

The blind panel is detachably or openably provided adjacent to the transparent front panel in front of the transparent front panel so that the blind panel can be removed or opened only when it is being observed. When it is not being observed, the blind panel can make the inside of the underground passage portion in conformity with an inherent nest-hole so that a hamster can take a rest mentally and physically in the underground passage portion.

If a small compartment is formed in the main box and an open-and-close means is provided to open and close the compartment, a user can make use of the compartment of the main box to accommodate food and breeding tools, or the like, and can keep the area around the breeding housing clean.

In addition, if the size of the base box is formed smaller than that of the cage so that the cage can be accommodated upside down inside of the cage, by accommodating the base box inside of the cage when not used, the whole breeding housing can be stored and carried compactly, and the cage can work as a protector of the base box, preventing the base box from being damaged.

The base box has, at its upper peripheral edge, an upstanding wall peripheral wall having a height higher than the level of the top board used as a ceiling and a floor so that the upstanding peripheral wall of the base box prevents a hamster from spreading food or excretion out of the casing when he exercises, thereby keeping the area around the breeding housing clean.

The terms and expressions which have been employed herein are used as terms of description and not of limitation, and there is no intent, in the use of such terms and expressions, of excluding any equivalents of the features shown and described or portions thereof, but it should be recognized that various modifications are possible within the scope of the invention claimed.

What is claimed is:

1. A housing for small pet animals such as rodents or the like, comprising:
    a base box having an underground passage forming member disposed in a front portion of said base box, said underground passage forming member having a front-opened underground passage portion formed like a nest-hole;
    a transparent front panel disposed in front of said underground passage forming member so as to close the front-opened underground passage portion;
    a lower opened cage placed on a ceiling panel formed on said base box;
    wherein said underground passage portion and a space in said cage communicate with each other through an opening formed in the ceiling panel; and
    wherein said transparent front panel is slidably enraged within fitting grooves formed on the inside surface of side walls of said base box so that said transparent front panel can be detachably attached to said base box.

2. A housing for small pet animals such as rodents or the like as recited in claim 1, wherein said underground passage forming member is, at its upper end, provided with an exit-and-entrance opening, and said ceiling panel opening is provided as a cut-out portion, at a portion corresponding to the exit-and-entrance opening, such that the inside of the underground passage portion and the inside of said cage communicate with each other.

3. A housing for small pet animals such as rodents or the like as recited in claim 1, wherein said underground passage forming member comprises a plurality of molded resin articles forming an underground passage forming member, the molded resin articles being combined in a direction of fore and aft so as to form an underground passage extending fore and aft and upwards and downwards.

4. A housing for small pet animals such as rodent or the like as recited in claim 1, wherein said base box has a compartment for accommodating small articles in a rear inside portion thereof and a door portion attached to a back wall thereof.

5. A housing for small pet animals such as rodents or the like as recited in claim 1, wherein the size of said base box is smaller than that of said cage so that said base box can be accommodated in said cage when placed upside down.

6. A housing for small pet animals such as rodents or the like, comprising:
    a base box having an underground passage forming member disposed in a front portion of said base box, said underground passage forming member having a front-opened underground passage portion formed like a nest-hole;
    a transparent front panel disposed in front of said underground passage forming member so as to close the front-opened underground passage portion;
    a lower opened cage placed on a ceiling panel formed on said base box; and
    a blind panel detachably attached to the front of said base box adjacent to the front side of said transparent front panel,
    wherein said underground passage portion and a space in said lower opened cage communicate with each other through an opening formed in the ceiling panel; and
    wherein said blind panel is slidably engaged within fitting grooves formed on the inside surface of side walls forming said base box.

7. A housing for small pet animals such as rodents or the like, comprising:
    a base box having an underground passage forming member disposed in a front portion of said base box, said underground passage forming member having a front-opened underground passage portion formed like a nest-hole;
    a transparent front panel disposed in front of said underground passage forming member so as to close the front-opened underground passage portion;
    a lower opened cage placed on a ceiling panel formed on said base box; and
    wherein said underground passage portion and a space in said cage communicate with each other through an opening formed in the ceiling panel, and
    wherein said base box comprises a front opened and upper opened main box, an outwardly protruded peripheral edge member extending from an upper peripheral edge of the main box, and an upstanding peripheral wall extending from an outer peripheral edge of the outwardly protruded peripheral edge member.

8. A housing for small pet animals such as rodents or the like as recited in claim 7, wherein the main box comprises a bottom wall, side walls extending from right and left edges of the bottom wall and a back wall extending from a rear edge of the bottom wall.

9. A housing for small pet animals such as rodents or the like as recited in claim 7, wherein said transparent front panel is detachably attached to said base box.

10. A housing for small pet animals such as rodents or the like as recited in claim 7, wherein said transparent front panel is slidably engaged within fitting grooves formed on the inside surface of side walls of said base box.

11. A housing for small pet animals such as rodents or the like as recited in claim 7, wherein said underground passage forming member is, at its upper end, provided with an exit-and entrance opening, and said ceiling panel opening is provided as a cut-out portion, at a portion corresponding to the exit-and-entrance opening, such that the inside of the underground passage portion and the inside of said cage communicate with each other.

12. A housing for small pet animals such as rodents or the like as recited in claim 7, wherein said underground passage forming member comprises a plurality of molded resin articles forming an underground passage forming member, the molded resin articles being combined in a direction of fore and aft so as to form an underground passage extending fore and aft and upwards and downwards.

13. A housing for small pet animals such as rodents or the like as recited in claim 7, further comprising a blind panel detachably attached to the front of the base box adjacent to the front side of the transparent front panel.

14. A housing for small pet animals such as rodents or the like as recited in claim 13, said blind panel is slidably engaged within fitting grooves formed on the inside surface of side walls forming said base box.

15. A housing for small pet animals such as rodents or the like as recited in claim 7, wherein said base box has a compartment for accommodating small articles in a rear inside portion thereof and a door portion attached to a back wall thereof.

16. A housing for small pet animals such as rodents or the like as recited in claim 7, wherein the size of said base box is smaller than that of said cage so that said base box can be accommodated in said cage when placed upside down.

\* \* \* \* \*